United States Patent [19]

Yang

[11] Patent Number: 5,384,520

[45] Date of Patent: Jan. 24, 1995

[54] BALANCED DRIVE MOTORS WITH CROSS-COUPLED EXCITATION

[76] Inventor: Tai-Her Yang, 5-1 Taipin Street, Si-Hu Town, Dzan-Hwa, Taiwan, Prov. of China

[21] Appl. No.: 998,402

[22] Filed: Dec. 29, 1992

[51] Int. Cl.$^6$ ............................ H02N 4/02; H02P 5/06
[52] U.S. Cl. ........................................ 318/79; 318/82; 318/112; 318/98; 310/112; 307/11
[58] Field of Search ............... 318/432, 433, 77, 79, 318/80, 81, 82, 83, 84, 85, 112, 98, 99, 100, 11, 6; 310/112, 114, 180; 475/201; 307/47, 11, 6, 36; 400/219.1

[56] References Cited

U.S. PATENT DOCUMENTS

| | | | |
|---|---|---|---|
| 1,907,596 | 5/1933 | Shirk | 318/80 |
| 2,182,631 | 5/1939 | Kenyon | 318/84 |
| 2,673,317 | 3/1954 | Nichols et al. | 318/85 |
| 3,578,998 | 5/1971 | Euerle | 307/47 |
| 3,596,155 | 7/1971 | Huxtable | 318/71 |
| 3,792,325 | 2/1974 | Berger | 318/79 |
| 4,294,552 | 10/1981 | Mako | 318/6 |
| 4,549,119 | 10/1985 | Slagle | 318/11 |
| 5,088,969 | 2/1992 | Arndt | 475/201 |
| 5,254,894 | 10/1993 | Satake et al. | 310/114 |

*Primary Examiner*—William M. Shoop, Jr.
*Assistant Examiner*—John W. Cabeca
*Attorney, Agent, or Firm*—Leonard Bloom

[57] ABSTRACT

Balanced-drive multiple motors each including an armature rotatably actuated by a field winding. Cross-coupled series excitation of the field windings is accomplished by electrically connecting the field winding of each motor in series with the armature of another motor, thereby balancing the rotational speed of all the motors when unequal loads are applied. A means for adjusting the proportionate speed of the motors is also disclosed.

27 Claims, 3 Drawing Sheets

BALANCED DRIVE MOTORS WITH CROSS-COUPLED EXCITATION

BACKGROUND OF THE INVENTION

1. Field of the Invention

The present invention relates to series or compound motors and, more particularly, to a plurality of motors having cross-coupled series-excitation for maintaining a balanced drive.

2. Description of the Background

Conventional AC or DC series excitation motors exhibit a specific characteristic, i.e., the rotational speed of the motor is inversely proportional to the square root of the torque. Hence, the rotational speed increases very fast under no load. When a load is driven by a series motors, and the load is unsteady, we usually need to prevent sudden load reducing which tends to accelerate the related series excitation motors during operation. This is especially true when the same load is jointly driven by two or more series motors, and an unsteady coupling relationship is formed between the load and the motors. In this case, the rotational speed of each respective motor will change suddenly, and this will further affect the stability of load. Compound motors may also exhibit this characteristic. For example, when conventional dual series-excitation or compound-excitation motors are used to drive the wheels of a loading machine, the ground coupling state will change and the motors will accelerate and decelerate intermittently, and poor operation will result.

U.S. Pat. No. 1,761,767 issued to Alexander shows cross-coupled generators which are used as brakes. The generators supply tapped resistances, and the resistance is progressively lowered to increase the braking action.

U.S. Pat. No. 2,763,823 issued to Symes uses cross-coupled motors to compensate for speed-differences. For instance, in a two-wheel differential gear-drive system, the cross-coupled compensates for the speed differential which occurs when the vehicle rounds a turn.

It would be greatly advantageous to adapt a cross-coupled configuration for AC or DC series excitation or compound-excitation motors which provides steady driving despite an unsteady load.

SUMMARY OF THE INVENTION

It is, therefore, an object of the present invention to provide AC or DC series excitation motors or compound-excitation motors according to the present invention having cross-coupled series excitation (or compound-excitation) field windings for stabilizing the motor drives despite an unsteady load, and for balancing the rotational speed of the multiple motors.

According to the present invention, the above-described and other objects are accomplished by providing balanced-drive multiple motors. The motors each include an armature rotatably actuated by a field winding. The field winding of each motor is electrically connected in series with the armature of another motor to equalize the rotational speed of all the motors when unequal loads are applied.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE INVENTION

Figure 1:
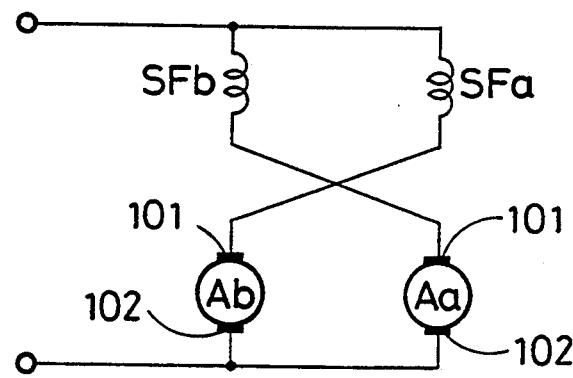
FIG. 1 is a diagram showing dual AC or DC motors having cross-coupled series excitation (or compound-excitation) according to one embodiment of the present invention.

Referring to FIG. 1, dual series-excitation motors according to one embodiment of the present invention are shown. The first series excitation motor has a magnetic winding SFa and armature Aa, and the second series excitation motor has a magnetic winding SFb and armature Ab. The series excitation magnetic winding SFa of the first series excitation motor is in series with the armature Ab of the second series excitation motor assembly, and the series excitation magnetic winding SFb of the second series excitation motor is in series with the armature Aa of the first series excitation motor assembly. When the load is steady during the operation of the two motors, SFa, Aa, SFb, and Ab all have equal current passing therethrough, and the operational speed of the two motors is also equal. The speed of the two motors will be increased/decreased simultaneously as the load changes. For instance, when the load on the first motor is increased, the rotational speed of armature Aa is reduced and current therethrough is increased. Since the armature Aa is in series with the magnetic field SFb of motor assembly B, the increase of SFb current enhances the magnetic field applied to armature Ab, and the rotational speed of armature Ab is reduced accordingly. In a like manner, when the load of the first motor gets weaker suddenly, armature Aa current is decreased and the series magnetic winding SFb reduces its magnetic effect on armature Ab, and the rotary speed of armature Ab gets faster. In a like manner, when the load applied to the second motor is increased, the rotational speed of armature Aa is reduced because armature Ab is in series with magnetic winding SFa. Conversely, when the load applied to the second motor is reduced suddenly, the field of SFb is reduced to accelerate armature Aa.

Figure 2:
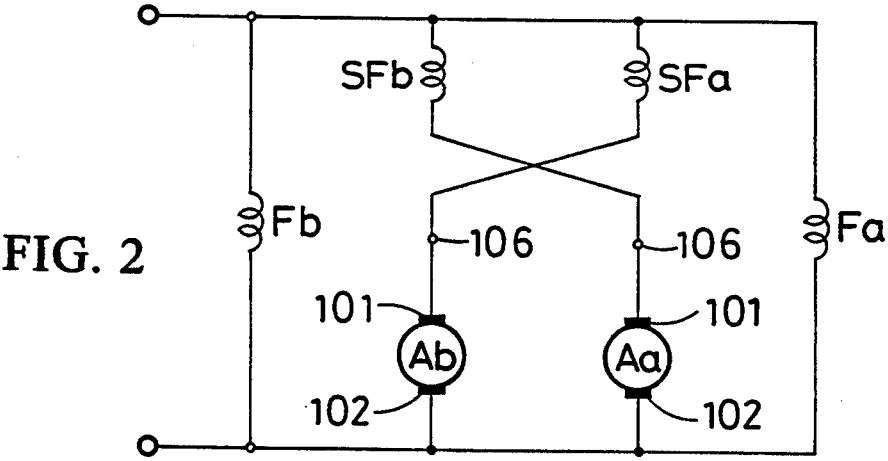
FIG. 2 is a diagram illustrating a cross-coupled compound excitation motor which includes shunt magnetic windings Fa and Fb coupled in parallel across the respective series-connected magnetic winding SFa and armature Aa, and the series-connected magnetic winding SFb and armature Ab.

The above-described cross-coupled excitation may also practiced with compound motors. FIG. 2 illustrates a cross-coupled compound excitation motor which is similar to the series embodiment of FIG. 1. In addition, the compound motor of FIG. 2 includes a pair of long-shunt magnetic windings Fa and Fb coupled in parallel across the respective series-connected magnetic winding SFa and armature Aa and the series-connected magnetic winding SFb and armature Ab. As clearly shown, each armature Aa and Ab has a first terminal 101 and a second terminal 102, respectively. Alternatively, the windings Fa and Fb may be connected in a short-shunt configuration (not shown) inside the series-connected magnetic windings SFa and SFb, i.e., in parallel across the respective armatures Aa and Ab. There is little practical difference between the two arrangements, and the essential cooperation between the magnetic winding SFa and armature Aa and the magnetic winding SFb and armature Ab is substantially the same.

Figure 3:
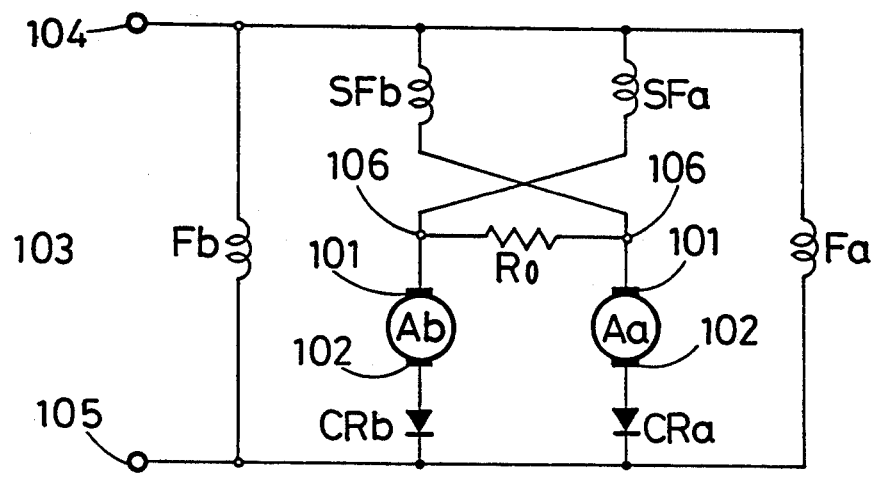
FIG. 3 illustrates the cross-coupled compound excitation motor as in FIG. 2 with the addition of optional resistor Ro and diodes CRa and CRb.

FIG. 3 illustrates the cross-coupled compound excitation motor as in FIG. 2 with the addition of two optional features. First of all, a resistor Ro may be coupled between the series-connection of magnetic winding SFa and armature Ab and the series-connected magnetic winding SFb and armature Aa. Resistor Ro serves as a current shunt path to help balance torque differentials occurring between the armatures Aa and Ab. For instance, when an unbalanced load imparts a higher torque on one motor, the slower high-torque motor will draw current directly from the faster motor through the shunt path Ro.

In addition, diodes CRa and CRb may be connected as shown between the respective armatures Aa and Ab and the input source 103. As clearly shown, the input source includes first and second terminals, 104 and 105, respectively. Diodes CRa and CRb limit the amount of current which may circulate from armature to armature, thereby avoiding an excessive current draw when a large load differential exists.

Figure 4:
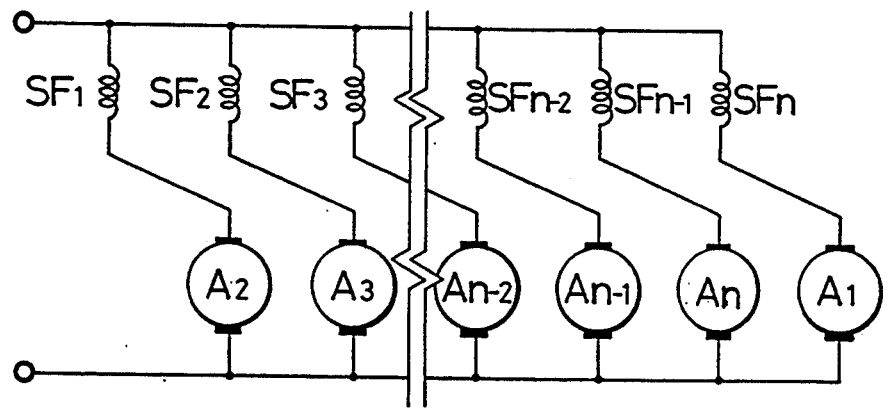
FIG. 4 is a diagram showing multiple AC or DC motors having cross-coupled series excitation (or compound-excitation) according to another embodiment of the present invention.
Figure 5:
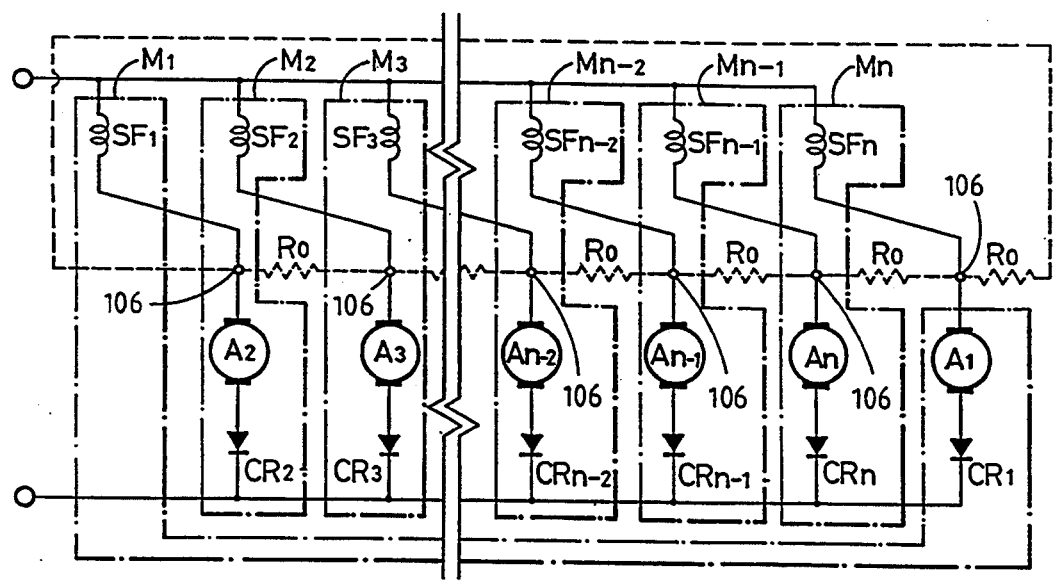
FIG. 5 is a diagram showing multiple AC or DC motors as in FIG. 4 with the addition of optional resistors Ro and diodes $CR_{1-N}$ similar to FIG. 3.

The principles inherent in the above-described embodiments may be expanded to multiple motors as shown in FIGS. 4 and 5.

In the embodiment shown in FIG. 4, any number of series excitation motors may be incorporated, each having a magnetic winding SF1-n and an armature A1-n. The series excitation magnetic winding SFn-2 of one series excitation motor is in series with the armature An-1 of an adjacent series excitation motor, and the series excitation magnetic winding SFn-1 of the second series excitation motor is in series with the armature An of the next adjacent series excitation motor. All the series excitation motors of the embodiment of FIG. 4 are connected in this manner, and the operation is essentially as described with reference to the embodiment of FIG. 1.

FIG. 5 illustrates the multiple cross-coupled motors as in FIG. 4 with the addition of optional resistors Ro and diodes $CR_{1-N}$. Resistor Ro may be a conventional multi-resistor IC having discrete resistive elements coupled as shown between pairs of interconnected in junction 106 magnetic windings SF1-n and armatures A1-n. Resistor Ro and diodes $CR_{1-N}$ accomplish the same functions as their counterparts in the embodiment of FIG. 3, and they do so in the context of multiple cross-coupled motors.

With the above-described operating characteristics the multi-unit AC or DC motors or compound-excitation motors having cross-coupled series excitation according to the present invention are particularly suitable for the operation on an unsteady load. More particularly, the cross-coupled series excitation is operative to balance the rotational speed of the two motors.

Figure 6:
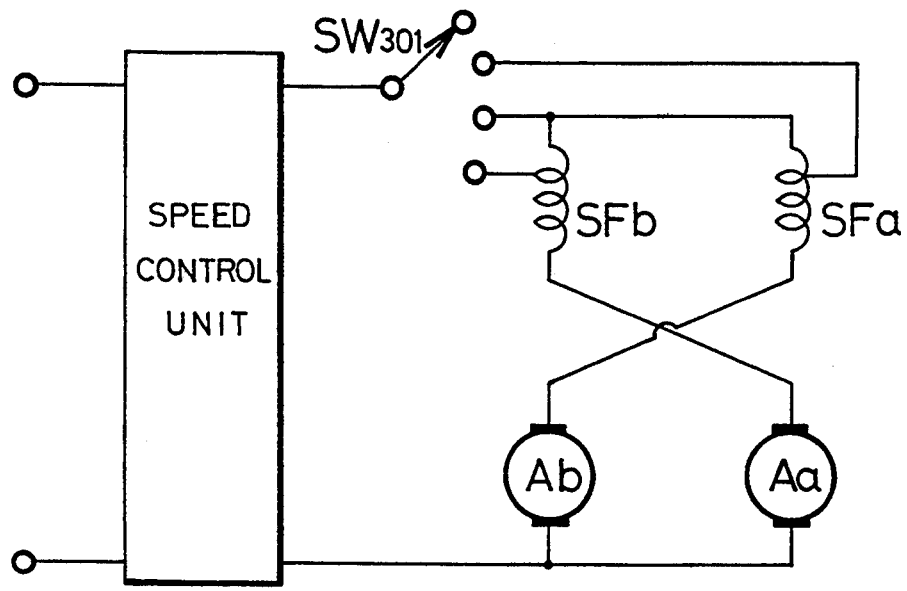
FIG. 6 is a diagram showing a tapped-control circuit that can control the operational speed of the motors of FIG. 1 by switching the operational turns ratio.

In practice, we may further employ a motor speed control or driving direction control for changing the rotational speed and direction of driving motor. As shown in FIG. 6, this is possible by withdrawing a tap from windings SFa and SFb as alternative power inputs to control the operational turns ratio between the field windings of the dual motors of FIG. 1. A switch $SW_{301}$ operates to apply input power evenly to both windings SFb and SFa or, alternatively, to one of the taps extending from either SFa or SFb. As shown in FIG. 6, a speed control unit may be provided for monitoring the operational speed of the motors, and for controlling the operational speed by switching the operational turns-ratio in accordance with the speed.

Figure 7:
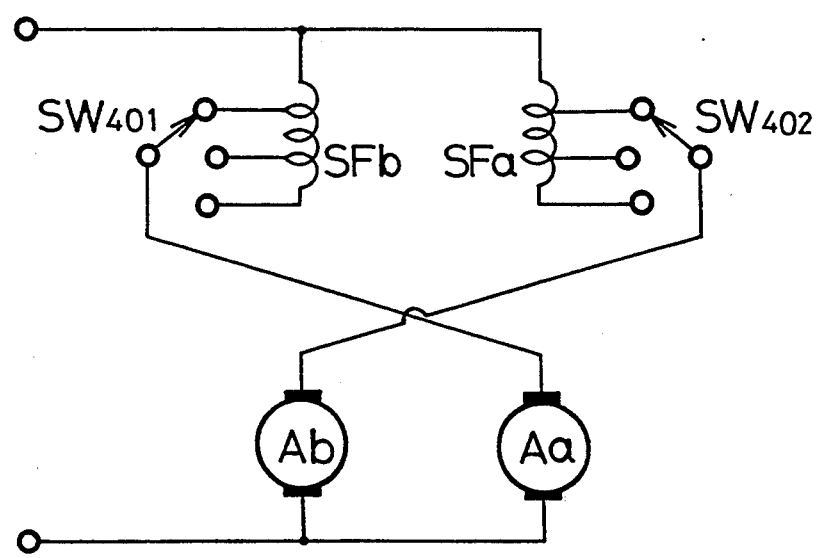
FIG. 7 is a diagram showing independent tapped-switches for separately switching the operational turns ratio for each field.

FIG. 7 illustrates an alternative means for switching the operational turns-ratio as described above. The embodiment of FIG. 7 employs independent switches $SW_{401}$ and $SW_{402}$ for each field winding SFa and SFb. The fields SFa and SFb respectively have a tap connected to one of the poles of the corresponding selective switch $SW_{401}$ and $SW_{402}$, and the common connections of selective switches $SW_{401}$ and $SW_{402}$ respectively leading to armature Aa and Ab, so that the operational turns ratio of the two motors may be selected by means of each selective switch $SW_{401}$ and $SW_{402}$. If one intends to increase armature Ab's operational speed and to reduce armature Aa's speed, then switches SFb and SFa may be switched to provide less excitation current to winding SFb. Armature Ab increases its operational speed, and winding SFa excitation current is increased to make armature Aa slow down.

In addition, to switch the operational direction of the motors disclosed in FIG. 6 and FIG. 7, it is only necessary to exchange the two taps of either the field windings or armature windings by conventional coupling means.

To conclude, the balanced-drive motors with cross-coupled AC or DC series excitation according to the present invention are effective to prevent changes in the proportionate speed ratio between motors when a common load is being jointly driven through an unsteady coupling.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. In balanced-drive dual motors with cross-coupled excitation comprising:
    a first motor including a first armature rotatably actuated by a first field winding, the first armature having a first and a second terminal;
    a second motor including a second armature rotatably actuated by a second field winding, the second armature having a first and a second terminal; and
    an input source, said input source having a first and a second terminal;
    said first field winding being electrically connected between the first terminal of said input source and the first terminal of said second armature, respectively, and said second field winding being electrically connected between the first terminal of said input source and the first terminal of said first armature, respectively, an improvement including a first and a second diode, wherein the first diode is connected between the second terminal of the first armature and the second terminal of the input source, respectively, and wherein the second diode is connected between the second terminal of the second armature and the second terminal of the input source, respectively.

2. The balanced-drive dual motors according to claim 1 wherein said input source is a DC source.

3. The balanced-drive dual motors according to claim 1 wherein said input source is an AC source.

4. The balanced-drive dual motors according to claim 1 wherein said first and second motors are series-excitation motors.

5. The balanced-drive dual motors according to claim 1 wherein said first and second motors are compound-excitation motors.

6. The balanced-drive dual motors according to claim 5 wherein said first and second compound excitation motors each further comprises a shunt winding coupled across the respective armatures.

7. The balanced-drive dual motors according to claim 6 wherein said shunt windings are short shunt windings.

8. The balanced-drive dual motors according to claim 6 wherein said shunt windings are long shunt windings.

9. Balanced-drive dual motors with cross-coupled excitation comprising:

a first motor including a first armature rotatably actuated by a first field winding;

a second motor including a second armature rotatably actuated by a second field winding;

said first field winding being electrically connected in series with said second armature and said second field winding being electrically connected in series with said first armature for equalizing a rotational speed of said first and second motors when unequal loads are respectively applied thereto, wherein said first and second motors are compound-excitation motors, wherein said first and second compound excitation motors each further comprises a shunt winding coupled across the respective armatures, further comprising a resistance connected on one side between said first field winding and second armature, and connected on another side between said second field winding and first armature for reducing a voltage differential between said windings.

10. Balanced-drive dual motors with cross-coupled excitation comprising:

a first motor including a first armature rotatably actuated by a first field winding;

a second motor including a second armature rotatably actuated by a second field winding;

said first field winding being electrically connected in series with said second armature and said second field winding being electrically connected in series with said first armature for equalizing a rotational speed of said first and second motors when unequal loads are respectively applied thereto, wherein said first and second motors are compound-excitation motors, wherein said first and second compound excitation motors each further comprises a shunt winding coupled across the respective armatures, further comprising a pair of diodes each connected between one of said first and second armatures and an input source.

11. In a system of balanced-drive multiple motors having cross-coupled series-excitation comprising:

a plurality of motors each including a respective armature rotatably actuated by a respective field winding; and an input source, said input source having respective terminals;

whereby said respective field windings of each one of said motors are electrically connected in series with said armature of another one of said motors for equalizing a rotational speed of said plurality of motors when unequal loads are respectively applied thereto, an improvement including a plurality of diodes, each connected between one of said armatures and one of the terminals of the input source, wherein said diodes are connected to the same terminal of the input source.

12. The balanced-drive dual motors according to claim 11 wherein said input source is a DC source.

13. The balanced-drive dual motors according to claim 11 wherein said input source is an AC source.

14. The balanced-drive dual motors according to claim 11 wherein said plurality of motors are series-excitation motors.

15. The balanced-drive dual motors according to claim 11 wherein said motors are compound-excitation motors.

16. The balanced-drive dual motors according to claim 15 wherein said compound excitation motors each further comprises a shunt winding coupled across the respective armatures.

17. The balanced-drive dual motors according to claim 16 wherein said shunt windings are short shunt windings.

18. The balanced-drive dual motors according to claim 16 wherein said shunt windings are long shunt windings.

19. Balanced-drive multiple motors having cross-coupled series-excitation comprising:

a plurality of motors each including an armature rotatably actuated by a field winding;

whereby said field windings of each one of said motors are electrically connected in series with said armature of another one of said motors for equalizing a rotational speed of said plurality of motors when unequal loads are respectively applied thereto, wherein said motors are compound-excitation motors, further comprising a resistance connected on one side between said field winding of each one of said motors and the armature of another one of said motors, and connected on another side between said field winding of another one of said motors and the armature of said one of said motors for reducing a voltage differential between said field windings of each one of said motors and said another one of said motors, respectively.

20. Balanced-drive multiple motors having cross-coupled series-excitation comprising:

a plurality of motors each including an armature rotatably actuated by a field winding;

whereby said field windings of each one of said motors are electrically connected in series with said armature of another one of said motors for equalizing a rotational speed of said plurality of motors when unequal loads are respectively applied thereto, wherein said motors are compound-excitation motors, further comprising a pair of diodes each connected between one of said armatures and an input source.

21. Variable balance dual motors with cross-coupled excitation comprising:
   a first motor having a first armature and a first tapped field winding for rotatably actuating said first armature;
   a second motor having a second armature and a second tapped field winding for rotatably actuating said second armature;
   said first field winding being electrically connected in series with said second armature, and said second field winding being electrically connected in series with said first armature for maintaining a constant proportionate rotational speed of said first and second motors when unequal loads are applied respectively thereto;
   said series-connected first field winding and second armature being connected in parallel with said series-connected second field winding and first armature; and
   a switch having a plurality of poles each connected to a corresponding tap on said first and second field winding;
   whereby said switch allows application of power to a selected one of said taps for adjusting said proportionate rotational speed of said first and second motors.

22. The variable balance dual motors with cross-coupled excitation according to claim 21 further comprising a speed control unit connected to said switch for monitoring said proportionate rotational speed of said first and second motors and operating said switch in accordance therewith.

23. Variable balance dual motors with cross-coupled excitation comprising:
   a first motor including a first armature and a first tapped field winding for rotatably actuating said first armature, said first field winding having at least one tap lead connected thereto;
   a second motor including a second armature and a second tapped field winding for rotatably actuating said second armature, said second field winding having at least one tap lead connected thereto;
   said first field winding being electrically connected in series with said second armature through a first switch, and said second field winding being electrically connected in series with said first armature through a second switch for maintaining a constant proportionate rotational speed of said first and second motors when unequal loads are respectively applied thereto;
   said first switch connecting said second armature to a selected tap on said first field winding, and said second switch connecting said first armature to a selected tap on said second field winding for adjusting said proportionate rotational speed of said first and second motors.

24. The improvement of claim 1, further including a resistance connected on one side between said first field winding and second armature, and connected on another side between said second field winding and first armature for reducing a voltage differential between said windings.

25. In balanced-drive dual motors with cross-coupled excitation comprising:
   a first motor including a first armature rotatably actuated by a first field winding;
   a second motor including a second armature rotatably actuated by a second field winding;
   wherein said first field winding being electrically connected in series with said second armature and said second field winding being electrically connected in series with said first armature;
   an improvement including a resistance connected on one side between said first field winding and second armature, and connected on another side between said second field winding and first armature.

26. The improvement of claim 11, further including a plurality of resistances, wherein each resistance of said plurality of resistances is connected on one side between the field winding of each one of said motors and said armature of another one of said motors, and connected on another side between the field winding of another one of said motors and said armature of said each one of said motors.

27. In a system of plurality of balanced-drive motors with cross-coupled excitation, each said motor including an armature rotatably actuated by a field winding; wherein the field winding of each one of said motors is electrically connected in respective junctions in series with the armature of another one of said motors, an improvement in a plurality of resistances, wherein each resistance is connected between the respective junctions of said motors.

* * * * *